US009612962B2

(12) United States Patent
Sanghvi et al.

(10) Patent No.: US 9,612,962 B2
(45) Date of Patent: Apr. 4, 2017

(54) PERFORMING CACHE BANK OPERATIONS IN OFFSET SEQUENCES FROM FIRST BANK

(71) Applicant: Texas Instruments Incorporated, Dallas, TX (US)

(72) Inventors: Hetul Sanghvi, Richardson, TX (US); Mullangi Venkata Ratna Reddy, Karnataka (IN); Ajit Deepak Gupte, Karnataka (IN); Arindam Basak, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 211 days.

(21) Appl. No.: 14/539,526

(22) Filed: Nov. 12, 2014

(65) Prior Publication Data

US 2015/0074318 A1 Mar. 12, 2015

Related U.S. Application Data

(62) Division of application No. 13/606,237, filed on Sep. 7, 2012, now abandoned.

(51) Int. Cl.
| | | |
|---|---|---|
| G06F 13/28 | (2006.01) |
| G06F 12/08 | (2016.01) |
| H04N 19/433 | (2014.01) |
| H04N 19/51 | (2014.01) |
| G06F 12/0846 | (2016.01) |

(52) U.S. Cl.
CPC .......... G06F 12/0848 (2013.01); G06F 13/28 (2013.01); H04N 19/433 (2014.11); H04N 19/51 (2014.11); G06F 2212/282 (2013.01)

(58) Field of Classification Search
None
See application file for complete search history.

(56) References Cited

U.S. PATENT DOCUMENTS

| 5,960,193 A * | 9/1999 | Guttag ................... G06F 7/544 708/236 |
| 8,458,405 B2 * | 6/2013 | Bronson .............. G06F 12/0895 711/130 |
| 8,510,496 B1 * | 8/2013 | Totolos, Jr. ........... G06F 3/0613 711/147 |

* cited by examiner

Primary Examiner — Said Broome
Assistant Examiner — Yu-Jang Tswei
(74) Attorney, Agent, or Firm — Lawrence J. Bassuk; Charles A. Brill; Frank D. Cimino

(57) ABSTRACT

In certain embodiments, methods and systems for multimedia data processing are provided. In an embodiment, a method for processing multimedia data includes defining one or more pixel block regions in a first cache so as to cache a plurality of reference pixel blocks corresponding to reference data. A reference pixel block from among the plurality of reference pixel blocks is assigned to a pixel block region from among the one or more pixel block regions based on a predetermined criterion. The reference pixel block is associated with a tag based on the pixel block region so as to facilitate a search of the reference data in order to process a plurality of pixel blocks associated with a multimedia frame of the multimedia data.

7 Claims, 8 Drawing Sheets

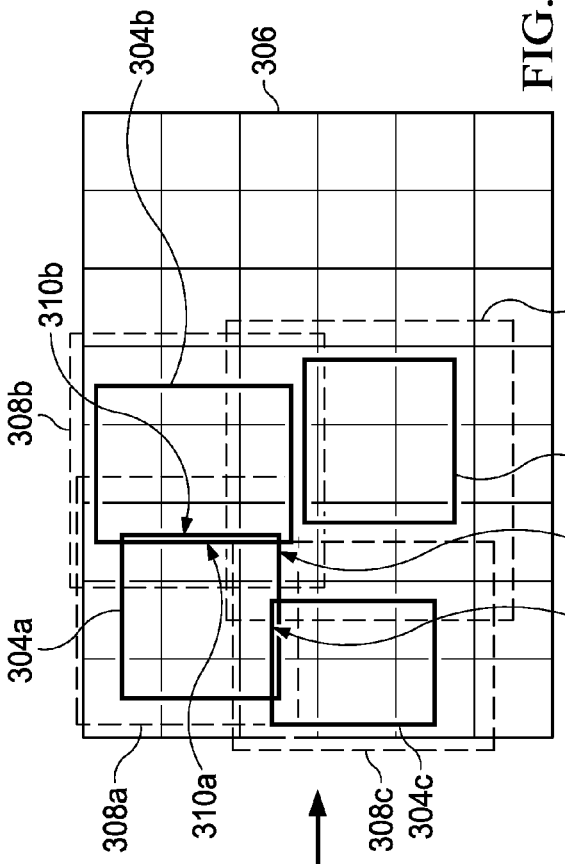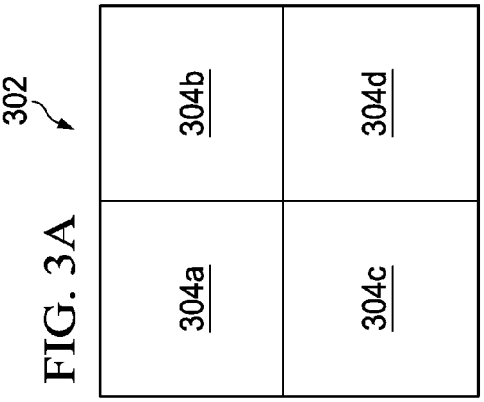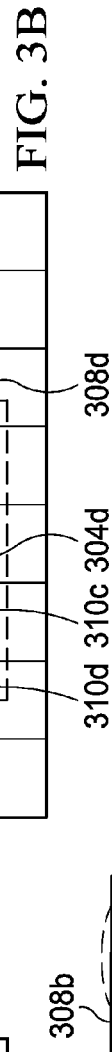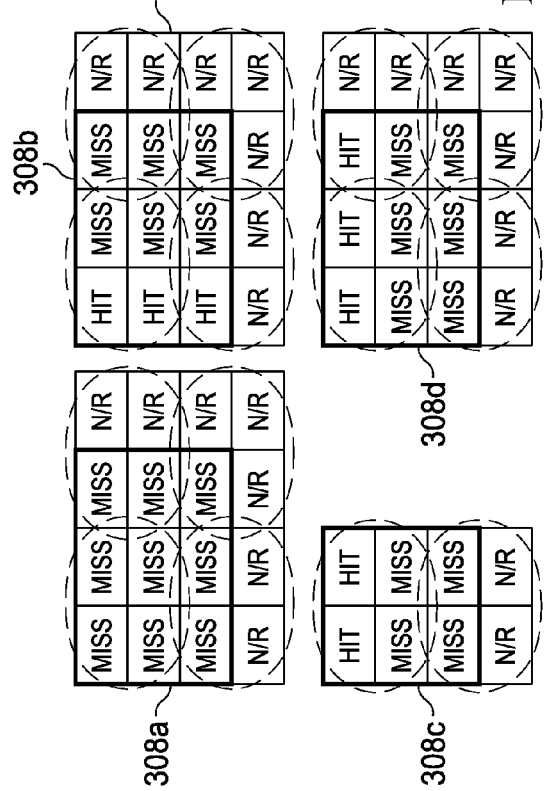
FIG. 3A
FIG. 3B
FIG. 3C

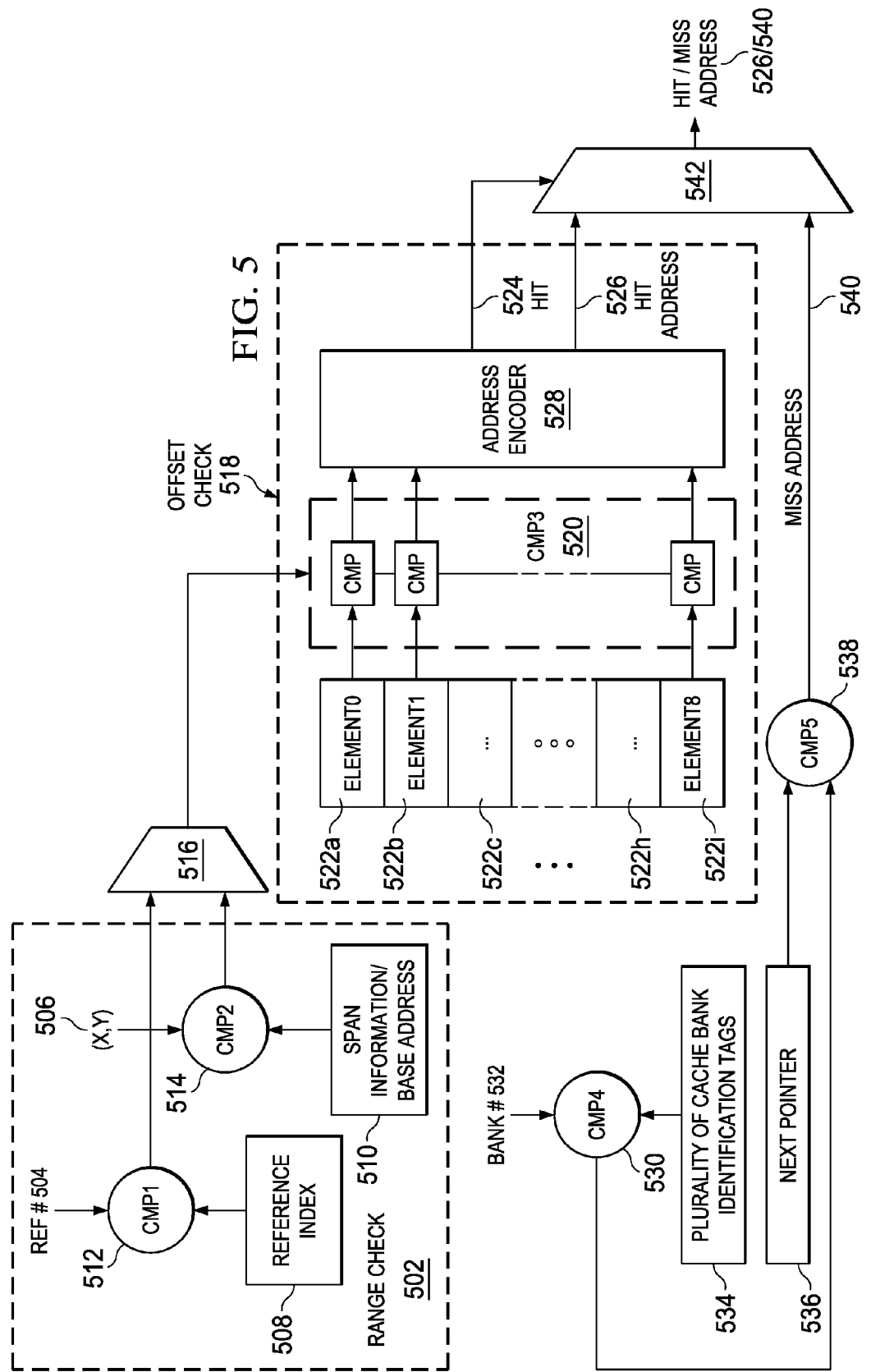

PERFORMING CACHE BANK OPERATIONS IN OFFSET SEQUENCES FROM FIRST BANK

This application is a divisional of prior application Ser. No. 13/606,237, filed Sep. 7, 2012, now abandoned.

TECHNICAL FIELD

The present disclosure generally relates to the field of data processing.

BACKGROUND

In an exemplary scenario, a rapid advancement in techniques related to multimedia data processing may place increased demands on the respective computing powers of various multimedia processors. The multimedia data processing may involve the encoding of multimedia data for compression purposes. The compression of multimedia data may be performed in order to save memory during storage or to efficiently utilize the available bandwidth during a transmission. The multimedia data may be encoded utilizing encoding mechanisms that are sufficient to achieve a compression of the multimedia data. The multimedia data may subsequently be decompressed (for example, decoded) for display/viewing purposes.

Moreover, in an exemplary scenario, various video coding paradigms may involve the encoding of frames corresponding to the multimedia data based on reference frames, thereby optimizing storage capacity and also enhancing a performance of the multimedia processors. In an exemplary scenario, the multimedia data processing may involve performing motion compensation, wherein reference pixels associated with a reference frame (for example, a previously decoded frame and stored in a memory) are fetched from a memory and interpolated to form a prediction frame. The prediction frame may be subtracted from a current frame to obtain residual samples corresponding to the current frame. The residual samples may then be encoded for the encoding of the current frame. In an exemplary scenario, while performing motion compensation, the reference pixels are fetched (for encoding various portions of the frame) randomly from the memory and a significant degree of overlap may exist among the fetched reference pixels. Pursuant to an exemplary scenario, a memory bandwidth consumption and a power dissipation may increase as a result of the random nature of fetching reference pixels.

SUMMARY

Methods and systems for multimedia data processing are disclosed. In one embodiment, in order to process a multimedia frame, the multimedia frame is divided into a plurality of block partitions, with each partition including a plurality of pixel blocks. In one embodiment, a first reference region is determined for the plurality of pixel blocks associated with the first block partition of the multimedia frame. In one embodiment, prior to fetching the first reference region from the memory, a presence of the first reference region is determined in a first cache. If the first reference region is determined to be unavailable in the first cache, then a presence of the first reference region is checked in the second cache. If the first reference region is determined to be unavailable in the second cache, the first reference region is fetched from the memory.

In one embodiment, the method includes defining one or more pixel block regions in the first cache so as to cache a plurality of reference pixel blocks corresponding to reference data. A reference pixel block from among the plurality of reference pixel blocks is assigned to a pixel block region from among the one or more pixel block regions based on a predetermined criterion. The reference pixel block is associated with a tag based on the pixel block region so as to facilitate a search of the reference data in order to process a plurality of pixel blocks associated with a multimedia frame of the multimedia data.

In an embodiment, the search of the reference data includes identifying pixel block regions from among the one or more pixel block regions that are likely to include the first reference region by comparing tag information associated with the first reference region with span information associated with one or more pixel block regions. Further, a presence of one or more reference pixel blocks associated with the first reference region is determined in the identified one or more pixel block regions. In an embodiment, determining the presence of the one or more reference pixel blocks includes determining a possible offset of the first reference region within each of the identified one or more pixel block regions based on the span information and a location of the first reference region within a reference frame associated with the reference data. A presence of the first reference region at the determined possible offset in the identified one or more pixel block regions may be determined by checking a plurality of availability tags associated with each reference pixel block at the determined possible offset.

In an embodiment, a minimum granularity for fetching a reference pixel block from among the one or more reference pixel blocks associated with the first reference region from the memory is matched with a minimum granularity of caching in a pre-fetch buffer associated with the memory. In an embodiment, one or more additional reference pixel blocks adjacent to the one or more reference pixel blocks associated with the first reference region within the reference frame and forming a rectangular region within the reference frame are fetched together. In an embodiment, the one or more additional reference pixel blocks and the first reference region correspond to a block partition from among a plurality of block partitions within the reference frame. In an embodiment, the one or more additional reference pixel blocks and the first reference region correspond to adjacent block partitions within the reference frame.

In one embodiment, a system configured to process multimedia data is disclosed. The system includes a memory, a cache unit and a processing unit. The memory is configured to store one or more reference frames corresponding to reference data. The cache unit is communicatively associated with the memory and comprises a first cache and a second cache. The processing unit is communicatively associated with the memory and the cache unit and is configured to define one or more pixel block regions in the first cache so as to cache a plurality of reference pixel blocks corresponding to the reference data. The processing unit is further configured to (1) assign the reference pixel block from among the plurality of reference pixel blocks to a pixel block region from among the one or more pixel block regions based on a predetermined criterion and (2) associate the reference pixel block with a tag based on the pixel block region so as to facilitate a search of the reference data in order to process a plurality of pixel blocks associated with a multimedia frame.

In one embodiment, a computer-readable medium storing a set of instructions that when executed cause a computer to perform a method for multimedia data processing is disclosed. The method includes defining one or more pixel block regions in a first cache so as to cache a plurality of reference pixel blocks corresponding to reference data. The reference data may be associated with a reference frame. The method also includes assigning a reference pixel block from among the plurality of reference pixel blocks to a pixel block region from among the one or more pixel block regions based on a predetermined criterion. Additionally, the method includes associating the reference pixel block with a tag based on the pixel block region so as to facilitate a search of the reference data in order to process a plurality of pixel blocks associated with a multimedia frame.

BRIEF DESCRIPTION OF THE FIGURES

FIGS. 3A-3C illustrate an exemplary exploitation of the overlap between a plurality of reference data fetches, such as by using the system of FIG. 1, according to an embodiment;

FIG. 5 illustrates an exemplary process of a search of reference data in order to process a plurality of pixel blocks associated with a multimedia frame according to an embodiment;

DETAILED DESCRIPTION

In an exemplary scenario, multimedia data processing may involve performing motion compensation for frames corresponding to multimedia data. In an exemplary scenario, while performing motion compensation, reference pixels are fetched (for encoding various portions of the frame) randomly from the memory, and a significant degree of overlap exists among the fetched reference pixels. Pursuant to an exemplary scenario, a memory bandwidth consumption and a power dissipation may increase as a result of the random nature of fetching reference pixels.

Various embodiments of the present technology provide certain advantages and benefits in the field of multimedia data processing. The following description and accompanying figures demonstrate that the present technology may be practiced or otherwise implemented in a variety of different embodiments. It is noted, however, that the present technology is not limited to any or all of the specifically disclosed embodiments. Indeed, one or more of the devices, features, operations, processes, or other qualities of a specifically disclosed embodiment may be removed, replaced, added to, or changed.

Figure 1:
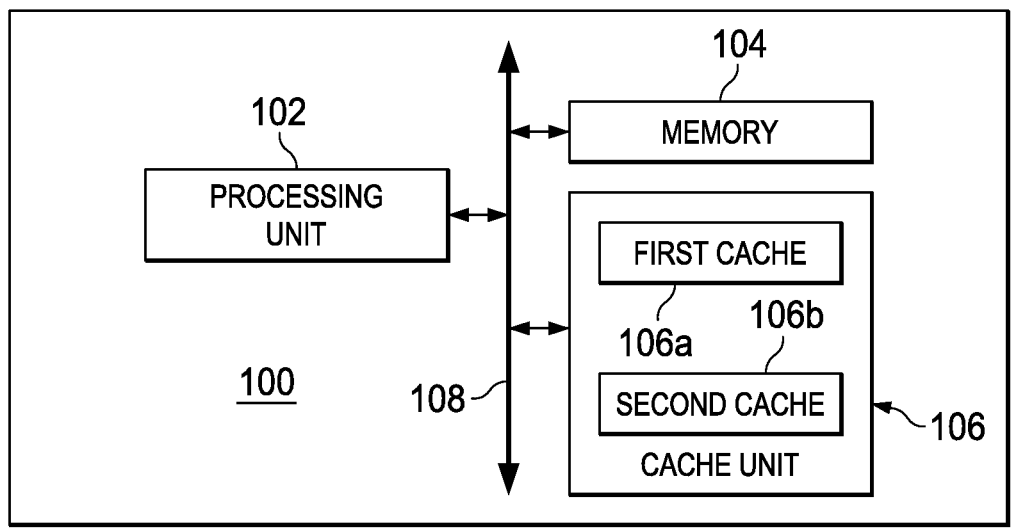
FIG. 1 is a block diagram of an exemplary system configured to process multimedia data according to an embodiment.

FIG. 1 is a block diagram of an exemplary system 100 configured to process multimedia data according to an embodiment. In an embodiment, the system 100 is configured to be a video codec (for example, video encoder/decoder) for processing of the multimedia data. In an embodiment, the system 100 is configured to be included within a multimedia system. In an embodiment, the system 100 is configured to be external to the multimedia system and is communicatively associated with the multimedia system. Examples of the multimedia system may include, but are not limited to: (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. Pursuant to an exemplary scenario, the system 100 may be any machine capable of executing a set of instructions (sequential and/or otherwise) so as to perform processing of the multimedia data.

The multimedia data may be received by the system 100 from a media capture device. Examples of the media capture device may include a video camera or a camcorder. The media capture device may be, for example, a stand-alone device or a part of a mobile device, such as, for example, a Smartphone, or a data processing device, such as, for example, a personal computer, a laptop device or a personal digital assistant (PDA). The multimedia data may also be received by the system 100 from a transcoding system (which may be implemented, for example, in any of hardware, software and/or firmware), which may be a stand-alone device or a part of the media capture device.

Pursuant to an exemplary scenario, the multimedia data may include a sequence of multimedia frames (hereinafter interchangeably referred to as "frames"), and each frame from among the sequence of frames may include a plurality of blocks (for example, macro blocks) of multimedia data. Examples of multimedia data may include, but are not limited to, audio data, video data, audio-video (A/V) data, image data, textual data and combinations thereof. An example of processing of the multimedia data may include performing motion compensation for the frames corresponding to the multimedia data for encoding/decoding purposes. Performing motion compensation for a frame of multimedia data involves encoding/decoding the frame with respect to a reference frame (for example, a previously decoded frame). In an embodiment, one or more reference pixels associated with the reference frame may be interpolated to configure a prediction frame in order to encode the frame. The prediction frame may be subtracted from the frame to obtain residual samples corresponding to the frame. The residual samples may then be encoded in order to encode the frame.

The system 100 includes a processing unit 102, a memory 104, a cache unit 106 and a bus 108. In an embodiment, the processing unit 102 may be embodied as a multi-core processor, a single core processor, or a combination of one or more multi-core processors and one or more single core processors. For example, the processing unit 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing unit 102 may be configured to execute hard-coded functionality. In an embodiment, the processing unit 102 is embodied as an executor of software instructions, wherein the instructions may specifically configure the processing unit 102 to perform the algorithms and/or operations described herein when the instructions are executed. The processing unit 102 may include, among other things, a clock, an arithmetic logic unit (ALU) and logic gates configured to support an operation of the processing unit 102. In an embodiment, the memory 104 is configured to store the multimedia data. In an embodiment, the memory 104 is configured to store reference data (for example, in the form of a plurality of reference frames) in order to process multimedia frames associated with the multimedia data.

In an embodiment, decoded frames of multimedia data may be stored in the memory 104 as the reference frames corresponding to the reference data. Examples of the memory 104 include, but are not limited to, a random access memory (RAM), a dual port RAM, a synchronous dynamic RAM (SDRAM), a double data rate SDRAM (DDR SDRAM), and the like. In an embodiment, the cache unit 106 is configured to cache frequently used reference data stored in the memory 104. As a result of limited bandwidth and high traffic conditions associated with the memory 104, storing the reference data in the cache unit 106 increases a processing performance associated with the system 100. The cache unit 106 includes a first cache 106a and a second cache 106b. In an embodiment, the first cache 106a may include one or more cache banks that may be implemented to cache the reference data. More specifically, a storage space associated with the first cache 106a may be considered to be partitioned (for example, into physical partitions or virtual partitions) and each such partition may be referred to as a cache bank, which may be utilized to cache the reference data. The cache banks are explained further herein with reference to FIG. 4B. In an embodiment, the second cache 106b may include one or more cache banks that may be implemented to cache the reference data. In an embodiment, the processing unit 102, the memory 104 and the cache unit 106 are configured to be communicatively associated, coupled or connected with each other via or through the bus 108. Examples of the bus 108 may include, but are not limited to, a data bus, an address bus, a control bus, and the like.

The bus 108 may be, for example, a serial bus, a bi-directional bus or a unidirectional bus. For multimedia data processing, each frame corresponding to the multimedia data may be divided into a plurality of pixel blocks. For example, the frame may be divided into a plurality of 16×16 pixel blocks, which may be referred to, for example, as a macroblock. Each such macroblock may further be partitioned into parts, such as, for example, into four partitions, wherein each partition may comprise four 4×4 pixel blocks. Each such partition of pixel blocks may be referred to herein as a block partition. As explained above, in order to process the frame, reference data may be fetched for various portions of the frame, such as for a plurality of pixel blocks associated with a block partition of the frame. In an embodiment, the processing unit 102 is configured to determine the reference data that is to be implemented to process the plurality of pixel blocks associated with the block partition of the frame of the multimedia data.

As explained, the reference data is stored in the memory 104 in the form of one or more reference frames. Each of the one or more reference frames includes one or more reference pixel blocks. It is noted that the terminology 'reference pixel block' may be construed as referring to, for example, an 'm×n' block of pixels within the reference frame associated with the frame of multimedia data, where m and n are positive integers. Determining the reference data that is to be implemented to process the plurality of pixel blocks associated with each block partition of the frame of the multimedia data may include determining the reference pixel blocks in the reference frames that may be utilized for processing purposes. In an embodiment, the reference pixel blocks fetched from the memory 104 are stored in the cache unit 106 for ease of future access of the reference data.

In an embodiment, the processing unit 102 is configured to define one or more pixel block regions in the first cache 106a associated with the cache unit 106 so as to cache the plurality of reference pixel blocks corresponding to reference data previously fetched from the memory 104. A pixel block region may be considered as an allotment of storage space within the first cache 106a, which is capable of caching one or more reference pixel blocks. One or more such storage spaces may be defined within the first cache 106a in order to cache the plurality of reference pixel blocks fetched from the memory 104. In an embodiment, a pixel block region may be associated with a cache bank from among the one or more cache banks of the first cache 106a. In an embodiment, the number of pixel block regions to be defined may be determined based on a video compression paradigm. Examples of the video compression paradigms include, but are not limited to video coding experts group (VCEG), H.120, H.261, moving pictures experts group (MPEG), MPEG-1 Part 2, H.262 or MPEG-2 Part 2, H.263, MPEG-4 Part 2, H.264 or MPEG-4 AVC, VC-2 (Dirac), high efficiency video coding (HEVC) and the like.

In an embodiment, each pixel block region is defined through span information, a base address, a cache bank identification tag, and/or a reference index. The span information is indicative of dimensions along a length direction (e.g., a height) and a width direction (e.g., a width) of each pixel block region. The base address is offset from, or with respect to, a top left address (for example, pixel co-ordinates of the top left pixel location) of each pixel block region from an origin pre-determined within a space defined by the reference frame and is indicative of the locality of the pixel block region within the space defined by the reference frame. The base address of each pixel block region is expressed in terms of x and y coordinates. The cache bank identification tag is indicative of a cache bank with which each pixel block region is associated. The reference index is indicative of the reference frame associated with each pixel block region. For example, if the reference data in the memory 104 includes 32 reference frames and the pixel block region is associated with reference frame #5 of the 32 reference frames, then the reference index of the pixel block region may indicate the reference frame #5 from which the reference pixel blocks included in the pixel block region are fetched.

In an embodiment, the processing unit 102 is also configured to assign the reference pixel block from among the plurality of reference pixel blocks corresponding to the reference data to a pixel block region from among the one or more pixel block regions. In an embodiment, the processing unit 102 assigns the reference pixel block to the pixel block region based on a predetermined criterion. In an embodiment, the predetermined criterion includes, but is not limited to, a locality of the reference pixel block within the space defined by the reference frame.

In an embodiment, each reference pixel block is associated with a tag based on the pixel block region so as to facilitate a search of the reference data in order to process a plurality of pixel blocks associated with the frame of the multimedia data. In an embodiment, the tag may be configured to provide an indication of a location of the reference pixel block within the pixel block region. In an embodiment, the tag may be defined based on an offset of the reference pixel block from a base address associated with the corresponding pixel block region. In an example embodiment, the width and height of each of the pixel block regions is 32 pixels×32 pixels, and a granularity of the pixel block region is 4×4 pixel blocks. Accordingly, eight 4×4 reference pixel blocks may be included along each of the x and y directions. Each 4×4 reference pixel block may be associated with a tag based on an offset from the base address of the corresponding pixel block region. The offset along the x and y directions would each utilize 3 bits, and therefore the size of each tag is 6 bits. The 4×4 pixel blocks may be searched in each of the one or more pixel block regions based on the tag.

In various exemplary caching techniques, the reference data in the memory is organized in the form of 4×4 reference pixel blocks, and each of the 4×4 reference pixel blocks in the memory is associated with a tag indicating a displacement along an x direction and a displacement along a y direction in a space defined by the reference frame. Considering that a maximum size of the reference frame is 8K×8K pixels in accordance with one or more multimedia coding paradigms, the number of 4×4 reference pixel blocks along the x and y directions would be 2K each. Since the 4×4 pixel blocks are tagged based on the x and y coordinates, a size of the tag would be 11 bits for x and 11 bits for y, totaling up to 22 bits. Also, each 4×4 pixel block fetched from memory is tagged with respect to the reference frame to which the 4×4 pixel block belongs. Some of the multimedia coding paradigms, such as, for example, H.264, allow up to 32 reference frames in the memory. Tagging based on 32 reference frames leads to an addition of 5 bits to the tag. Therefore, a size of the tag for each reference pixel block may be 27 bits when 32 reference frames are utilized. In an embodiment, about 288 tags are utilized to perform a good caching. Since the size of each tag is 27 bits, 288 27-bit comparisons are involved during the caching. Performing 288 27-bit comparisons in order to determine and fetch reference data would dissipate a significant amount of power. Defining pixel block regions in the first cache 106a and tagging reference pixel blocks as offset from the base address of the corresponding pixel block region reduces a size of the tag from 27 bits to 6 bits, thereby reducing a cost of comparison and leading to a sizable savings in power consumption.

In an embodiment, a minimum granularity for fetching each of the one or more reference pixel blocks from the memory 104 is matched with a minimum granularity to cache in a pre-fetch buffer associated with the memory 104 for optimal performance of the memory 104. For example, if the data organization in the pre-fetch buffer is block-based, then the fetching of the reference pixel blocks is aligned to be in blocks, thereby optimizing a fetching of the reference data. Similarly, if the data organization in the pre-fetch buffer is line-based (for example, rows of reference data fetches are sequentially fetched), then the fetches of reference pixels are aligned to be line-based reference data fetches. In an embodiment, each pixel block region is sparsely filled and includes a select few reference pixel block entries (also referred to as elements). In an embodiment, each of the one or more pixel block regions includes nine elements i.e., nine reference pixel blocks are associated with each pixel block region. In an embodiment, each element associated with a pixel block region is assigned a specific location within the pixel block region based on its location within a corresponding reference frame.

In an embodiment, reference pixel blocks belonging to a single reference frame are assigned to a pixel block region from among the one or more pixel block regions. In an embodiment, each pixel block region is defined within a cache bank from among the one or more cache banks associated with the first cache 106a. In an embodiment, a cache bank identification tag is associated with each pixel block region so as to indicate the cache bank within which each pixel block region is defined.

In an embodiment, the second cache 106b is organized so as to cache the reference data associated with a first block partition from among a plurality of block partitions associated with the multimedia data in order to render the reference data available during the processing of one or more subsequent block partitions of the multimedia data. In an embodiment, the pixel blocks within a frame of multimedia data are processed in a raster scan order. It is noted that the terminology "raster scan order" may be construed as referring to, for example, a left to right and a top to bottom order. Accordingly, pixel blocks in a row are processed from left to right followed by the pixel blocks in subsequent rows within the frame of multimedia data. During the processing of one or more subsequent rows associated with the frame, the reference data associated with one or more previous rows may have already been deleted from the first cache 106a. However, the pixel blocks in adjacent rows of the frame may have a commonality in the reference data fetches. The second cache 106b disclosed herein enables the exploitation of the commonality in reference data fetches for adjacent rows of the frame. In an embodiment, the second cache 106b is defined to have a span along a width direction equivalent to a width of a block partition of the frame and a variable dimension along a length direction (e.g. a height), depending on a configuration of the system 100.

In an embodiment, the reference data fetched from the memory 104 is populated in the second cache 106b if the reference pixel blocks associated with the reference data lie within the span of the second cache 106b. In an embodiment, reference data cached in the first cache 106a is populated in the second cache 106b upon an expiration of the reference data in the first cache 106a. In an embodiment, the reference data cached in the first cache 106a expires one cache bank at a time upon all (or a preselected amount) of the reference data stored in the cache bank being read from the cache bank. During the processing of the subsequent rows of the frame, an availability of space within the second cache 106b is determined in order to cache the fetched reference pixel blocks. If the space in the second cache 106b is determined to be available, the fetched reference pixel blocks are populated in the second cache 106b. In an embodiment, one or more previously cached reference pixel blocks in the second cache 106b are deleted if the space in the second cache 106b is determined to be unavailable. An origin of the second cache 106b is shifted by a predetermined margin in order to cache the fetched reference pixel blocks upon deleting the one or more previously cached reference pixel blocks. The origin is shifted to facilitate the simultaneous reading of reference data from a row of the second cache 106b while writing reference data into another row of the second cache 106b. In an embodiment, the second cache 106*b* is organized in a block-based manner, and the reference data populated in the second cache 106*b* is tagged with a displacement in horizontal and/or vertical directions.

In one embodiment, the second cache 106*b* is organized in a line-based manner. Additionally, in an embodiment, if the reference data is determined to be absent in the first cache 106*a*, the reference data is searched in the second cache 106*b*. If the reference data is determined to be present in the second cache 106*b*, the reference data is assigned to one of the pixel block regions of the first cache 106*a* for future reference pixel fetches. Pursuant to one embodiment, however, if the reference data is determined to be unavailable, i.e. absent in the second cache 106*b*, the reference data is fetched from the memory 104. A number of processing cycles (for example, 10 processing cycles) utilized for fetching the reference data from the second cache 106*b* is lesser than the number of processing cycles (for example, 100 processing cycles) utilized for fetching the reference data from the memory 104. In an embodiment, the second cache 106*b* is "one way associative/direct mapped" such that each entry in the memory 104 is cached at one particular location in the second cache 106*b*. In an embodiment, a plurality of luminance (hereinafter referred to as "luma") components and a plurality of chrominance (hereinafter referred to as "chroma") components of the reference data are cached separately in the second cache 106*b* and/or the memory 104. In an embodiment, the luma components are organized in the memory 104 and/or the second cache 106*b* as 4×4 pixel blocks, and the chroma components are organized as 8×2 pixel blocks.

In an embodiment, the processing unit 102 is configured to fetch one or more additional reference pixel blocks adjacent to the one or more reference pixel blocks associated with the first reference region within the reference frame and forming a rectangular region within the reference frame. In an embodiment, the one or more additional reference pixel blocks and the first reference region correspond to a block partition from among a plurality of block partitions within the reference frame. In an embodiment, the one or more additional reference pixel blocks and the first reference region correspond to adjacent block partitions within the reference frame. In an embodiment, processing unit 102 is configured to generate a memory fetch command in order to fetch the one or more additional reference pixel blocks and the one or more reference pixel blocks associated with the first reference region from the memory 104. In an embodiment, processing unit 102 is further configured to fetch the one or more additional reference pixel blocks and the one or more reference pixel blocks associated with the first reference region from the memory based on the generated memory fetch command.

In an embodiment, the system 100 additionally includes components, such as an input unit (e.g., an image processing device), a video display unit (e.g., liquid crystals display (LCD), a cathode ray tube (CRT), and the like), a cursor control device (e.g., a mouse), a drive unit (e.g., a disk drive), a signal generation unit (e.g., a speaker) and/or a network interface unit. The input unit is configured to transfer the multimedia data to the processing unit 102 for processing of the multimedia data. The drive unit includes a machine-readable medium upon which is stored one or more sets of instructions (e.g., software) embodying one or more of the methodologies and/or functions described herein. In an embodiment, the software resides, either completely or partially, within the memory 104 and/or within the processing unit 102 during the execution thereof by the system 100, such that the memory 104 and processing unit 102 also constitute a machine-readable media. The software may further be transmitted and/or received over a network via the network interface unit.

The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions for execution by the system 100 and that cause the system 100 to perform any one or more of the methodologies of the various embodiments. Furthermore, the term "machine-readable medium" may be construed to include, but shall not be limited to, solid-state memories, optical and magnetic media, and carrier wave signals.

Figure 2:
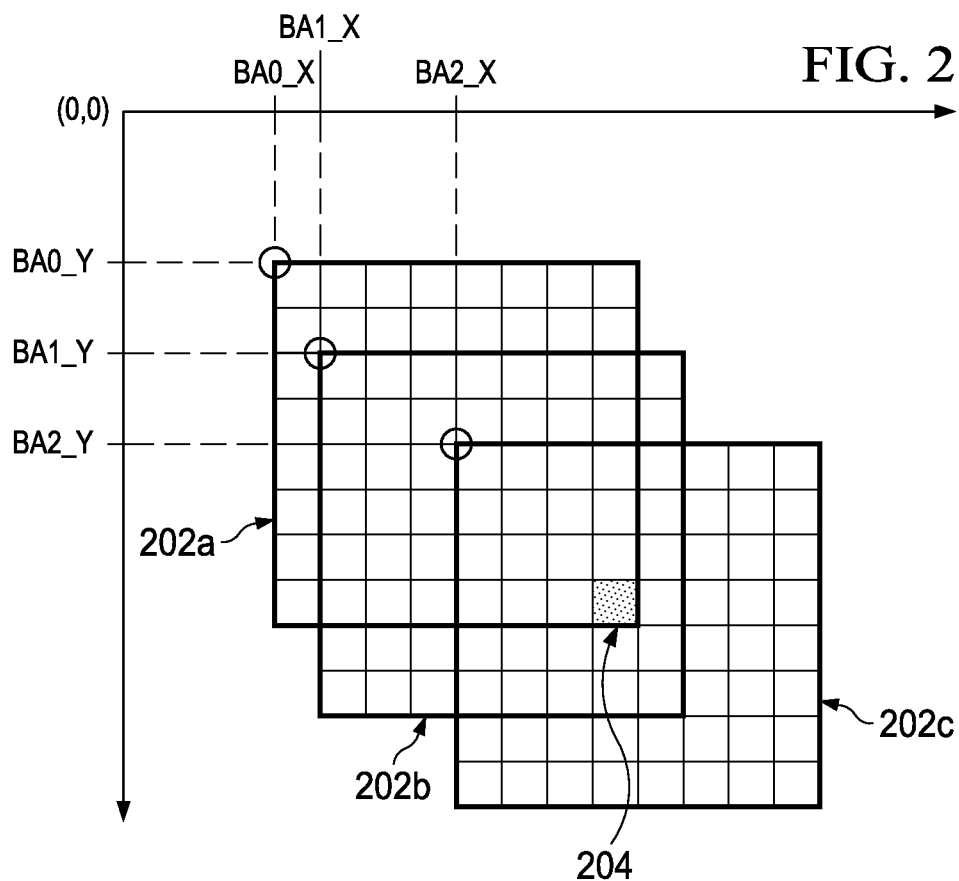
FIG. 2 illustrates a plurality of exemplary pixel block regions defined in a first cache according to an embodiment.

FIG. 2 illustrates a plurality of exemplary pixel block regions defined in a first cache 106*a* according to an embodiment. In FIG. 2, three pixel block regions, such as a first pixel block region 202*a*, a second pixel block region 202*b*, and a third pixel block region 202*c* are depicted. It is noted that a plurality of such pixel block regions may be defined in the first cache 106*a* in order to cache the reference pixel blocks fetched from one of the second cache 106*b* and the memory 104. As explained herein with reference to FIG. 1, each pixel block region may be considered as an allotment of storage space within the first cache 106*a* that is capable of caching a plurality of reference pixel blocks. In an embodiment, a number of pixel block regions defined is determined based on a video compression paradigm.

Further, as explained herein with reference to FIG. 1, each pixel block region is defined through the span information, the base address, and/or the reference index. In an embodiment, the base address for a pixel block region may be defined in terms of displacement of a pixel block region from a pre-defined location (referred to herein as the "origin") within a storage space defined by the first cache 106*a*. In an embodiment, the origin may be associated with co-ordinates (0, 0) and the displacement of a left topmost pixel corresponding to a pixel block region from the origin be measured to compute the displacement in x and y directions for defining the base address corresponding to the pixel block region. In FIG. 2, the first pixel block region 202*a* is depicted to be associated with a displacement of BA0_X along the x-direction and a displacement of BA0_Y along the y-direction from the origin (0, 0) and is defined by a base address (BA0_X, BA0_Y). The second pixel block region 202*b* is depicted to be associated with a displacement of BA1_X along the x-direction and a displacement of BA1_Y along the y-direction from the origin (0, 0) and is defined by a base address of (BA1_X, BA1_Y). Similarly, the third pixel block region 202*c* is depicted to be associated with a displacement of BA2_X along the x-direction and a displacement of BA2_Y along the y-direction from the origin (0, 0) and is defined by a base address of (BA2_X, BA2_Y).

Each reference pixel block corresponding to the reference data fetched for processing the plurality of pixel blocks of the frame is assigned to a pixel block region from among the one or more pixel block regions. In an embodiment, each of the one or more reference pixel blocks is a 4×4 block of pixels. In an embodiment, each reference pixel block corresponding to the reference data is assigned to the pixel block region based on a predetermined criterion. In an embodiment, the predetermined criterion includes, but is not limited to, a locality of the reference pixel block within the space defined by the reference frame (for example, the reference frame in the memory 104 from which the reference pixel block has been fetched). Each of the plurality of pixel block regions may include one or more reference pixel blocks assigned therein.

In order to process a pixel block of the frame, the reference data for the pixel block is determined, and the presence of the reference data is searched in the pixel block regions. Tag information associated with the reference data is compared with (1) the span information, and/or (2) the base address of the pixel blocks regions and one or more pixel block regions likely to include the reference pixel blocks associated with the reference data are identified. Consider, for example, a reference pixel block 204 associated with reference data and assigned to the third pixel block region 202c. The reference pixel block 204 is disposed in a region common to each of the first pixel block region 202a, the second pixel block region 202b, and the third pixel block region 202c. Upon performing a search for the reference pixel block 204 in the pixel block regions, it is determined that the first pixel block region 202a, the second pixel block region 202b, and the third pixel block region 202c are likely to include the reference pixel block 204. Tag information associated with the reference data to be fetched is compared with the tag of reference pixel blocks in each of the three pixel block regions, and it is determined that the reference pixel block 204 is available in the pixel block region 202c.

If the reference pixel blocks are determined to be unavailable in the pixel block regions defined in the first cache 106a, then it is determined whether the reference pixel blocks are available in the second cache 106b. If it is determined that the reference pixel blocks are present in the second cache 106b, then the reference pixel blocks are fetched from the second cache 106b and cached in pixel block regions for processing the plurality of pixel blocks corresponding to the frame. If the reference pixel blocks are determined to be unavailable in the second cache 106b, then the reference pixel blocks are fetched from the memory 104. In an embodiment, the caching operation is configured to be completed in about 100 cycles, and therefore a plurality of pixel blocks are processed simultaneously in order to achieve optimal performance. In an example embodiment, a set of four adjacent pixel blocks are processed simultaneously. The four pixel blocks are simultaneously processed in order to exploit an overlap between reference data fetches for the four pixel blocks. This is explained further herein with reference to FIGS. 3A-3C.

FIGS. 3A-3C illustrate an exemplary exploitation of an overlap between a plurality of reference data fetches, such as by using the system 100, according to an embodiment. As explained herein with reference to FIG. 1, a multimedia frame is divided into macroblocks, such as, for example, 16×16 pixel blocks, and each macroblock is further partitioned into parts. FIG. 3A illustrates a macroblock 302 associated with the multimedia frame. The macroblock 302 is further partitioned into four adjacent block partitions, such as a first block partition 304a, a second block partition 304b, a third block partition 304c, and a fourth block partition 304d. Each block partition includes a plurality of pixel blocks (not shown in FIG. 3A). In an embodiment, each block partition includes four 4×4 pixel blocks. As explained herein with reference to FIG. 2, the pixel blocks associated with each of the plurality of block partitions are simultaneously processed in order to exploit an overlap between reference data fetches for the reference pixel blocks. Accordingly, for processing a plurality of pixel blocks in each block partition, a reference region is determined. The determination of the reference region is explained herein with reference to FIG. 3B.

In order to process the plurality of pixel blocks in each block partition, reference regions (in the reference data) to be fetched are determined. In FIG. 3B, based on the locality of the pixel blocks corresponding to each block partition in a reference frame 306, four reference regions (depicted by dotted squares in FIG. 3B), such as a first reference region 308a, a second reference region 308b, a third reference region 308c and a fourth reference region 308d, are determined as corresponding to the plurality of pixel blocks in the four partitions. As explained herein with reference to FIG. 1, since the data organization in the memory 104 (or a pre-fetch buffer associated with the memory 104) is depicted to be block-based, a minimum granularity of fetching the reference pixels is block-based. Accordingly, it is determined that nine reference pixel blocks are to be fetched from the memory 104 corresponding to the first reference region 308a in order to fetch reference data for pixel blocks associated with the first block partition. Further, it is determined that nine reference pixel blocks, six reference pixel blocks, and nine reference pixel blocks are to be fetched from the memory 104 as corresponding to the second reference region 308b, third reference region 308c, and fourth reference region 308d, respectively. If the reference pixel blocks fetched for the adjacent reference regions overlap, then the reference pixel blocks fetched for one of the reference regions and cached in a pixel block region may be made available for subsequent fetches, and the available reference pixel blocks are reused as explained herein with reference to FIG. 3C.

FIG. 3C illustrates a plurality of reference pixel block fetches for the four adjacent block partitions of the pixel block 302. During the processing of the pixel blocks associated with the first block partition 302a, the pixel block regions defined in the first cache 106a are devoid of reference data. Accordingly, a presence of the nine reference pixel blocks that are to be implemented to process the pixel blocks associated with the first block partition 304a in the pixel block regions of the first cache 106a is determined. Initially, the pixel block regions defined in the first cache 106a are devoid of reference data, and it is determined that the nine reference pixel blocks are unavailable in the first cache 106a; moreover, the absence of each of the nine reference pixel blocks is recorded as a 'MISS' in the first reference region 308a. Since the desired reference data is determined to be unavailable in the first cache 106a, the nine reference pixel blocks are to be fetched from the memory 104. A set of four processing cycles (represented by circles in FIG. 3C) would be implemented to fetch the desired nine reference pixel blocks. In an embodiment, four pixel blocks are fetched in each processing cycle, and, accordingly, a number of additional pixel blocks in addition to the nine reference pixel blocks are fetched. Such pixel blocks are marked as "Not Relevant" (or "N/R") in FIG. 3C. The nine reference pixel blocks are fetched from the memory 104 and cached in one or more pixel block regions in the first cache 106a.

As illustrated in FIG. 3B, a right edge 310a of the first reference region 308a and a left edge 310b of the second reference region 308b lie in three common square blocks, which creates an overlap between the first reference region 308a and the second region 308b. As a result of the reference data fetch for the processing of the first block partition 304a, reference pixel blocks that are to be implemented to process the pixel blocks corresponding to the second block partition 304b are already fetched and cached in the first cache 106a. As a result, upon checking a presence of the nine reference pixel blocks that are to be implemented to process the second block partition 304b, it is determined that three reference pixel blocks are available, and, accordingly, the presence of three reference pixel blocks is recorded as a "HIT" and the absence of the remaining six reference pixel blocks is recorded as a "MISS". In order to fetch the six reference pixel blocks, four processing cycles are implemented. Some additional reference pixel blocks in addition to the six reference pixel blocks may be fetched during the fetching of the implemented reference data, and such pixel blocks are marked as "N/R". The six reference pixel blocks are fetched from the memory 104 and cached in one or more pixel block regions in the first cache 106a.

Further, a lower edge 310c of the first reference region 308a and an upper edge 310d of the third reference region 308c lie in two common square blocks creating an overlap between the first reference region 308a and the third reference region 308c. As a result of the reference data fetch for processing the first block partition 304a, two reference pixel blocks that are to be implemented to process the pixel blocks corresponding to the third block partition 304c are already fetched and cached in the first cache 106a. On checking a presence of the six reference pixel blocks that are to be implemented to process the third block partition 304c, it is determined that two reference pixel blocks are available and accordingly the presence of two reference pixel blocks is recorded as "HIT" and the absence of the remaining four reference pixel blocks is recorded as "MISS". For fetching the four reference pixel blocks, two processing cycles are implemented. Some additional reference pixel blocks in addition to the four reference pixel blocks may be fetched during the fetching of the implemented reference data and such reference pixel blocks are marked as "N/R". The four reference pixel blocks are fetched from the memory 104 and cached in one or more pixel block regions in the first cache 106a.

Similarly, for processing the pixel blocks corresponding to the fourth partition 304d, an availability of the nine reference pixel blocks in the pixel block regions of the first cache 106a is checked and accordingly, the reference pixel blocks are associated with a HIT or a MISS. Those pixel blocks, which are recorded as a MISS are fetched from the memory 104 and cached in the pixel block regions of the first cache 106a. The fetched reference data is utilized for processing the pixel blocks in the plurality of block partitions of the frame. The various stages included in processing the multimedia data is explained herein with reference to FIG. 4A.

Figure 4A:
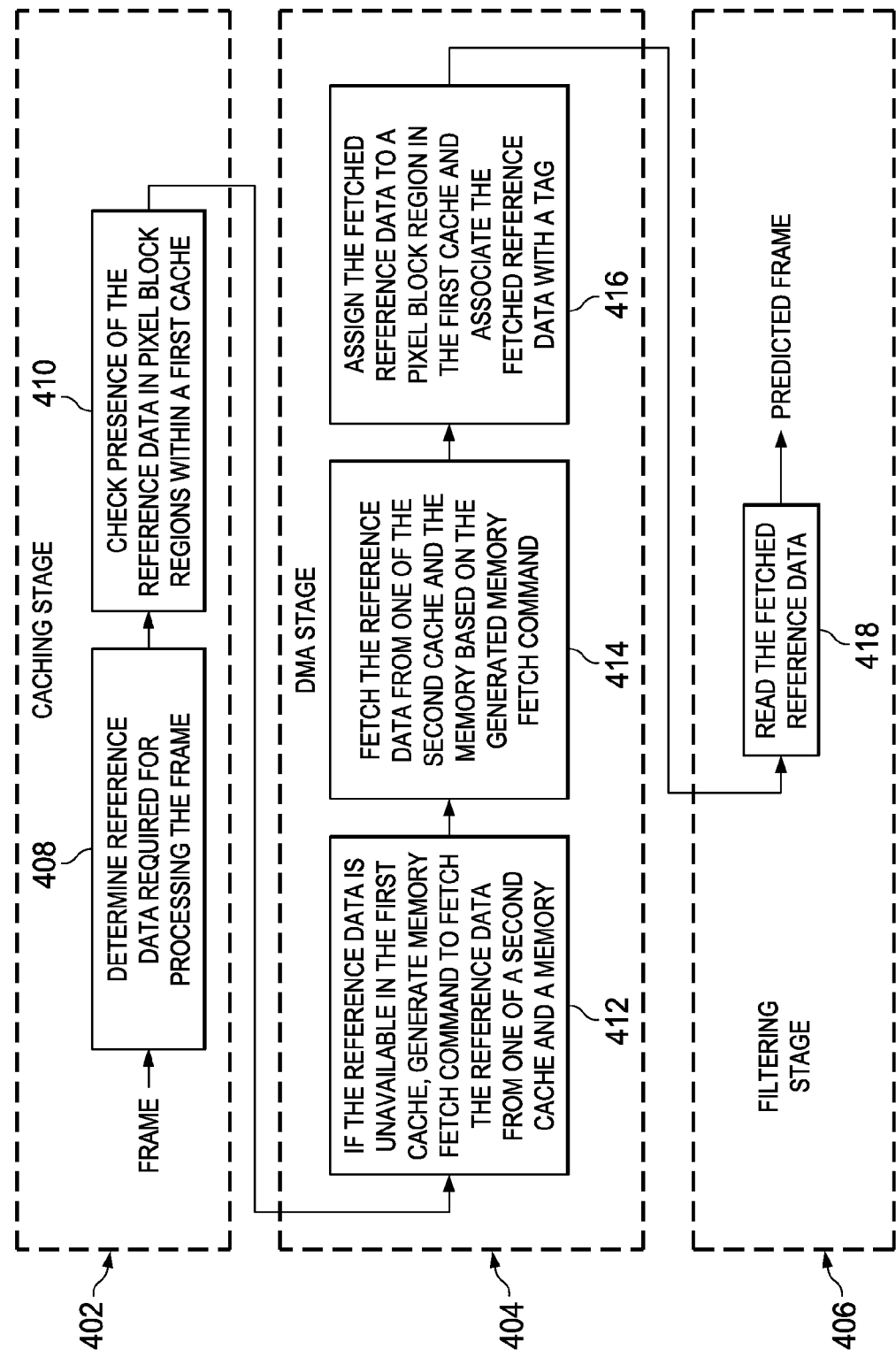
FIG. 4A depicts a simplified overview of an exemplary process flow illustrating a processing of a multimedia frame associated with multimedia data according to an embodiment.

FIG. 4A depicts a simplified overview of an exemplary process flow illustrating a processing of a multimedia frame associated with multimedia data in the system 100, according to an embodiment. In an embodiment, the processing of the multimedia frame is performed in three stages, such as a caching stage 402, a direct memory access (DMA) stage 404, and a filtering stage 406. In the caching stage 402, at step 408, reference data that is to be implemented to process the frame is determined (for example, by the processing unit 102 of FIG. 1) and subsequently a presence of the reference data is checked in the first cache 106a (for example, by the processing unit 102) at step 410. Though in FIG. 4A, a frame is depicted as an input to the caching stage 402, in some embodiments, the frame is divided into blocks and further each block is partitioned and the reference data determined and fetched for the plurality of pixel blocks within each block partition of the frame (as explained herein with reference to FIGS. 3A-3C). In an embodiment, a size of reference pixel block to be fetched is determined to be slightly bigger than the size of the corresponding pixel block of the frame. For example, for a 4×4 pixel block of the frame, a 9×9 reference pixel block (five additional pixels on each side i.e., three additional pixels on left and two on right) is determined to be fetched from a reference frame for interpolation during motion compensation. Similarly, for an 8×8 pixel block of the frame, a 13×13 reference pixel block may be determined to be fetched from the reference frame for interpolation.

As explained herein with reference to FIGS. 1 and 2, the processing unit 102 may be configured to define pixel block regions in the first cache 106a. The pixel block regions are configured to be capable of caching plurality of reference pixel blocks corresponding to the reference data previously fetched from one of the second cache 106b and the memory 104. On determining the reference data for the frame, one or more pixel block regions that are likely to include the reference data are identified (for example, using the processing unit 102 of FIG. 1). A presence of one or more reference pixel blocks associated with the reference data in the identified pixel block regions is determined (for example, using the processing unit 102 of FIG. 1).

In the DMA stage 404, at step 412, upon determining unavailability of the one or more of reference pixel blocks associated with the reference data in the identified pixel block regions, one or more memory fetch commands are generated (for example, by the processing unit 102 of FIG. 1) to fetch the one or more reference pixel blocks from one of the second cache 106b and the memory 104. In an embodiment, upon determining an unavailability of the reference pixel blocks in the pixel block regions, an availability of the reference pixel blocks is checked in the second cache 106b. If the reference pixel blocks are determined to be available in the second cache 106b, then the reference pixel blocks are fetched and cached in the pixel block regions of the first cache 106a for processing pixel blocks of the frame. If the reference pixel blocks are determined to be unavailable in the second cache 106b, then the reference pixel blocks have to fetched from the memory 104. At step 414, reference data is fetched (for example, by the processing unit 102 of FIG. 1) from the memory 104 based on the generated memory fetch command. At step 416, each of the one or more reference pixel blocks fetched from the memory 104/the second cache 106b is assigned (for example, by the processing unit 102 of FIG. 1) to a pixel block region from among the one or more pixel block regions defined in the first cache 106a based on a predetermined criterion. In an embodiment, the predetermined criterion includes, but is not limited to a locality of the reference pixel block within the reference frame and the locality of the pixel block region within the space defined by the reference frame. Subsequent to assignment, each of the one or more reference pixel blocks is associated (for example, by the processing unit 102 of FIG. 1) with a tag based on the pixel block region so as to facilitate a search of the reference data in order to process subsequent pixel blocks of the frame.

In the filtering stage 406, at step 418, the one or more reference pixel blocks (corresponding to pixel blocks of the frame) fetched and assigned to a pixel block region from among the one or more pixel block regions, are read (for example, by the processing unit 102) and subjected to processing to obtain a predicted frame. The predicted frame may thereafter be used for processing (for example, encoding/decoding based on motion compensation) of the frame of the multimedia data.

Figure 4B:
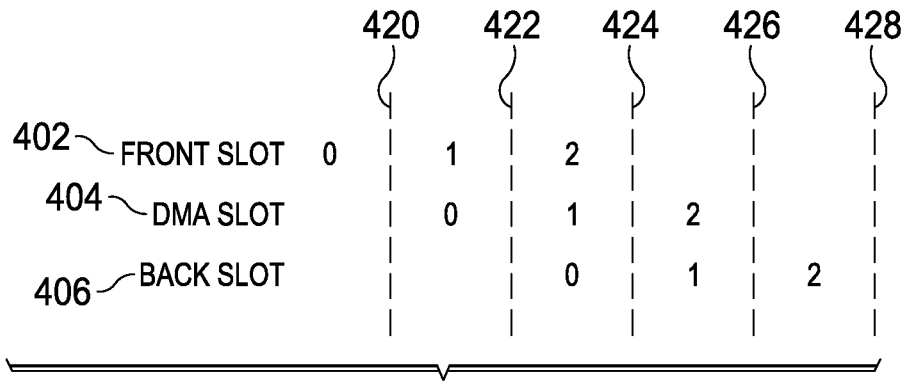
FIG. 4B illustrates an exemplary scheduling of read/write operations associated with the first cache during a processing of the multimedia frame according to an embodiment.

FIG. 4B illustrates an exemplary scheduling of read/write operations associated with the first cache 106a during a processing of the multimedia frame, according to an embodiment. In an embodiment, the first cache 106a is divided into multiple cache banks for scheduling of the read/write operations. In an embodiment, the first cache 106a is designed to operate with three cache banks, for example, a cache bank 0, a cache bank 1, and a cache bank 2 in a pipeline/sequential manner. In FIG. 4B, the cache bank 0, the cache bank 1, and the cache bank 2 are represented by digits 0, 1, and 2, respectively. The pipeline approach precludes the possibility of performing read and write operations simultaneously into a given cache bank.

In an embodiment, the pipeline has three pipeline slots corresponding to various stages involved during processing of the multimedia data in the system 100. The three pipeline slots depicted in FIG. 4B are a front slot 432, a DMA slot 434 and a back slot 436. In an embodiment, the front slot 432 corresponds to processing stage including determination of the reference data to be fetched from the memory 104 of FIG. 1 and the generation of the memory fetch commands for fetching the reference data, the DMA slot 434 corresponds to processing stage including the fetching of the reference data and assigning the fetched reference data to pixel block regions in the first cache 106a (write operation on the first cache 106a of FIG. 1), and the back slot 436 corresponds to processing stage including reading of the reference data (for example, by the processing unit 102 of FIG. 1) for configuring the prediction frame for processing of the frame associated with the multimedia data. The cache banks (0, 1 and 2) are subjected to the pipeline slots (432, 434, and 436) in a sequential, recurring manner, through a plurality of passes 420-428 (represented by dotted vertical columns) of pipeline slots 432-436.

In FIG. 4B, in a first pass 420 of the pipeline slots (432-436), the cache bank 0 is subjected to the front slot 432. The reference data (corresponding to plurality of pixel blocks associated with the frame) to be fetched is determined. More specifically, the reference data that is to be implemented to process the plurality of pixel blocks is identified and the presence of the reference data in the first cache 106a and subsequently in the second cache 106b is checked. On determining unavailability of the reference data in the first cache 106a and the second cache 106b, the reference data is to be fetched from the memory 104. The reference pixel blocks corresponding to the reference data to be fetched from the memory 104 (for example, the reference pixel blocks recorded as MISS in FIG. 3C) is assigned to the cache bank 0.

In an embodiment, an availability of space within a cache bank (e.g., cache bank 0, cache bank 1 or cache bank 2) for accommodating the reference pixel blocks to be fetched is checked prior to performing the fetching operation. If sufficient space to accommodate the reference pixel blocks is available in the cache bank, then the reference pixel blocks are allotted to the cache bank and processed along with a group of reference pixel blocks already present in the cache bank. However, if the space is determined to be insufficient, then reference pixel blocks are allotted to a new cache bank in a next subsequent pass. In an embodiment, a maximum possible number of reference pixel blocks are accommodated in a cache bank. In an embodiment, reference pixel blocks corresponding to four macroblocks of the frame are allotted to a cache bank. In an embodiment, all reference pixel blocks corresponding to a macroblock of the frame may be included in a single cache bank. In an embodiment, if all reference pixel blocks corresponding to a macroblock cannot be accommodated in one cache bank, then the reference pixel blocks corresponding to that macroblock are included in the next cache bank during the next pass of the pipeline slots (432-436).

As depicted in FIG. 4B, during the first pass 420, the cache bank 0 is subjected to the front slot 432. During a second pass 422, the cache bank 1 is subjected to the front slot 432 and the cache bank 0 is subjected to DMA slot 434. All the pixel block regions defined during the front slot 432 are associated or tagged with the cache bank address of the cache bank. In an embodiment, pixel block regions defined for caching reference pixel blocks corresponding to the pixel blocks of the first block partition of the frame are associated with the cache bank 0. All pixel block regions defined for a subsequent block partition of the frame may be associated with the cache bank 1.

During a third pass 424, the cache bank 2 is subjected to front slot 432, the cache bank 1 is subjected to DMA slot 434, and the cache bank 0 is subjected to back slot 436 (filtering stage). Prior to subjecting the cache bank 2 to the DMA slot 434 in a fourth pass 426, all pixel block regions in the cache bank 0 are invalidated and deleted as the pixel block regions associated with the cache bank 0 would not be implemented and pixel block regions with the cache bank 1 would be retained for processing the cache bank 2. In an exemplary embodiment, the cache bank 2 may include multimedia data associated with a reference pixel block associated with a row of pixel blocks within a reference frame. The cache bank 1 may include multimedia data associated one or more reference pixel blocks to the left of the reference pixel block in the row of the reference pixel blocks and the cache bank 0 may include multimedia data associated with one or more reference pixel blocks in a top row located above the row of the reference pixel block in the reference frame. The multimedia data associated with the one or more reference pixel blocks of cache bank 1 may be utilized while processing the reference pixel block of cache bank 2, however, the multimedia data associated with the one or more reference pixel blocks of the cache bank 0 may not be utilized while processing the reference pixel block of cache bank 2 owing to the one or more reference pixel blocks of the cache bank 0 belonging to the top row. Therefore, one or more pixel block regions of cache bank 0 may be invalidated and/or deleted while processing cache bank 2 to make available space to accommodate other additional reference data that may be utilized during the processing of the multimedia data. In an embodiment, during a fifth pass 428, the cache bank 2 is subjected to the back slot 436. In an embodiment, a plurality of cache banks is simultaneously subjected to the front slot 432, the DMA slot 434, and/or the back slot 436.

FIG. 5 illustrates an exemplary process of searching reference data in order to process a plurality of pixel blocks associated with a multimedia frame, according to an embodiment. As explained herein with reference to FIGS. 3A-3C, for processing pixel blocks associated with a block partition of the multimedia frame, reference regions for each block partition are determined and then their presence is checked, i.e., searched in the first cache 106a of FIG. 1. More specifically, a presence of the reference pixel blocks corresponding to each reference region is checked in one or more pixel block regions in the first cache 106a. Accordingly, a range check 502 of the reference pixel blocks is performed, wherein a reference number (ref #) 504 and a location co-ordinates (X, Y) 506 associated with the reference pixel blocks are compared with a reference index 508 and span information/base address 510 in the tag information associated with each pixel block region, respectively, to identify the pixel block regions likely to include the reference pixel blocks. As explained herein with reference to FIGS. 3A-3C, the reference regions are determined within the reference frame stored in the memory 104 and accordingly, the reference pixel blocks within the reference region are tagged with the reference number (ref #) 504 corresponding to the reference frame and location co-ordinates 506 corresponding to the locality within the reference frame. A first comparison block 512 (depicted as CMP1 in FIG. 5) is utilized to perform a comparison between the reference number (ref #) 504 and the reference index 508 of one or more pixel block regions. Further, a second comparison block 514 (depicted as CMP2 in FIG. 5) is utilized to perform a comparison between location co-ordinates 506 and the span information/base address 510.

In an embodiment, the span information is indicative of dimensions along a length direction (for example, a height of the pixel block region) and a width direction (for example, a width of the pixel block region) of each pixel block region. During the comparison, it is determined if $$X >= BA\text{-}X \text{ and } < BA\text{-}(X+\text{width of the pixel block region}) \text{ and}$$

$$Y >= BA\text{-}Y \text{ and } < BA\text{-}(Y+\text{height of the pixel block region})$$

wherein, BA is a base address of each of the one or more pixel block regions.

Based on the output of the two comparison blocks 512 and 514, the pixel block regions likely to include the reference pixel blocks are determined at block 516. Subsequently, an offset check 518 is performed to determine the presence of the reference pixel blocks within the pixel block regions identified as likely to include the reference pixel blocks. At the offset check 518, it is determined that the offset information included in location co-ordinates 506 (X, Y) of the reference pixel blocks matches with the offset of elements (reference pixel blocks previously fetched and cached in the pixel block regions) included in these pixel block regions. In FIG. 5, each pixel block region is depicted to include nine elements, however, it is noted that the pixel block regions may include more of fewer number of elements. A third comparator block 520 is utilized for comparing tag information of the elements 522a-522i within each of the pixel block regions likely to include the reference pixel blocks with the offset information of the reference pixel blocks. The third comparator block 520 (depicted as CMP3 in FIG. 5) is depicted to include a number of comparators (each depicted as CMP within CMP3 520 in FIG. 5) equivalent of maximum number of elements in a pixel block region for performing the comparisons in a parallel manner. For the one or more elements lying at the determined possible offset a plurality of availability tags associated with the elements at the determined possible offset is checked. In an embodiment, the reference pixel block is allowed to be present in a single pixel block region in accordance with a design of the system 100 of FIG. 1. In an embodiment, if the reference pixel block is present, an availability tag of the plurality of availability tags associated with the elements is marked as a HIT 524 and if absent the availability tag is marked as a MISS. If the availability tag indicates presence of the reference pixel block (e.g., HIT 524) an address of the element (e.g., HIT address 526) is encoded through an address encoder 528.

If the availability tag indicates absence of the reference block, a bank check is performed at a fourth comparator block 530 (depicted as CMP4 in FIG. 5) by comparing a current cache bank identification tag 532 (BANK #) with each of a plurality of cache bank identification tags 534 associated with the identified pixel block regions (as explained herein with reference to FIG. 4B) to determine one or more pixel block regions with the current cache bank identification tag 532. Subsequently, it is checked if the determined pixel block regions with the current cache bank identification tag 534 have an availability of space to allot the reference pixel blocks absent in the identified pixel block regions. An absence of elements at the determined possible offset within the determined pixel block regions may indicate an availability of space. Also the absence of elements at the determined possible offset is indicated by a validity of a next pointer 536. The next pointer 536 is compared with an output of the cache bank check at a fifth comparator block 538 (depicted as CMP5 in FIG. 5). If the cache bank check yields the output and the next pointer 538 is valid, the address of the absent element (e.g., MISS address 540) is determined using an encoder 542. The reference pixel blocks are fetched (e.g., using the processing unit 102 of FIG. 1) from the memory 104 or the second cache 106b and assigned (e.g., using the processing unit 102 of FIG. 1) to one of the identified pixel block regions. If none of the identified pixel block regions with the current cache bank identification tag 532 have availability of space, then a new pixel block region is created to assign the reference pixel blocks fetched from the memory 104 or the second cache 106b.

In an embodiment, an availability of a space within the cache bank is determined for accommodating the reference pixel blocks to be fetched from the memory. On determining availability of the space, the reference pixel blocks are allotted to the cache bank. In an embodiment, to reduce a latency of data fetch from memory 104, the reference pixel blocks corresponding to the first reference region are fetched in combination with one or more additional reference pixel blocks aligned to be fetched from the memory 104 using a single memory fetch command. In an embodiment, one or more additional reference pixel blocks to be fetched along with the reference pixel blocks are determined (e.g., using the processing unit 102 of FIG. 1) such that the reference pixel blocks and the one or more additional reference pixel blocks are adjacent to one another within the reference frame. Also, the one or more additional reference pixel blocks are determined such that the one or more additional reference pixel blocks and the reference pixel blocks together form a rectangular region (contiguous region) within the reference frame. In an embodiment, the one or more additional reference pixel blocks and the reference pixel blocks correspond to a block partition from among a plurality of block partitions within the frame. In an embodiment, the reference pixel blocks and the one or more additional reference pixel blocks may belong to adjacent block partitions within the reference frame and may together form a rectangular region (contiguous region) within the reference frame. The one or more additional reference pixel blocks and the reference pixel block may be fetched together from the memory 104 based on a single memory fetch command.

In an embodiment, the reference pixel block and the one or more additional reference pixel blocks of a block partition may be merged together with one or more reference pixel blocks of an adjacent block partition, while being aligned to be fetched. The reference pixel block, the one or more additional reference pixel blocks, and the one or more reference pixel blocks may form a rectangular (contiguous region) and may be fetched from the memory 104 based on a single memory fetch command. The one or more additional reference pixel blocks and the reference pixel blocks may be allotted to same or different cache banks while being aligned to be fetched from the memory 104. In an embodiment, a memory fetch command may be created (e.g., using the processing unit 102 of FIG. 1) for the cache bank for fetching the allotted reference pixel block and the one or more additional reference pixel blocks from the memory 104. The allotted reference pixel block and the one or more additional reference pixel blocks may be fetched (e.g., using the processing unit 102 of FIG. 1) from the memory 104 based on the created memory fetch command. Since the reference pixel block and the one or more additional reference pixel blocks are fetched together from the memory, a total number of tags used for fetching the reference data from the memory may be reduced facilitating a conformance with the system performance specifications.

In an embodiment, the first cache 106a may not involve predictive pre-fetch due to the organization of the cache unit 106 and the system 100 and each of the reference pixel blocks unavailable in the first cache 106a are to be fetched separately from the memory 104. Each of the reference pixel blocks may be assigned a tag. In some platforms (e.g., OMAP™), a number of tags allowable is limited and assigning each of the reference pixel blocks the tag, renders it difficult to meet a system performance specification. Additionally, a size of the reference data fetch is maintained within a maximum burst size allowable in the system 100. In an embodiment, a break down logic is implemented to maintain the size of the reference data fetch within the maximum burst size. The maximum burst size includes, for example eight data phases. The reference data fetching from the memory 104 is explained further in FIGS. 6A-6C.

Figure 6A:
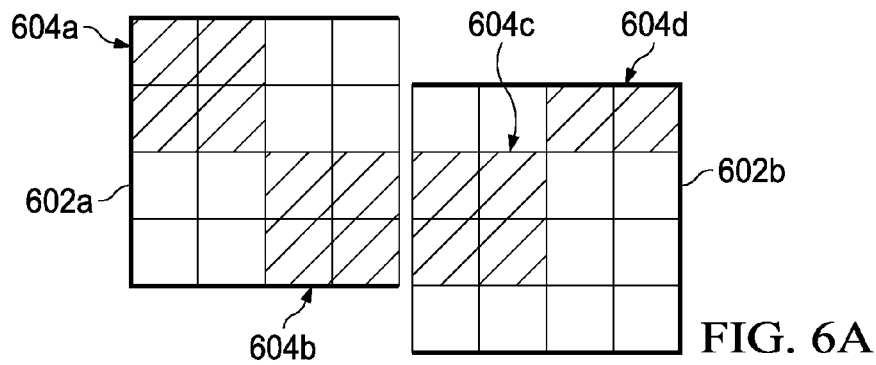
FIGS. 6A-6C illustrate exemplary fetching reference pixel blocks adjacent to one another within a reference frame associated with reference data according to an embodiment.
Figure 6B:
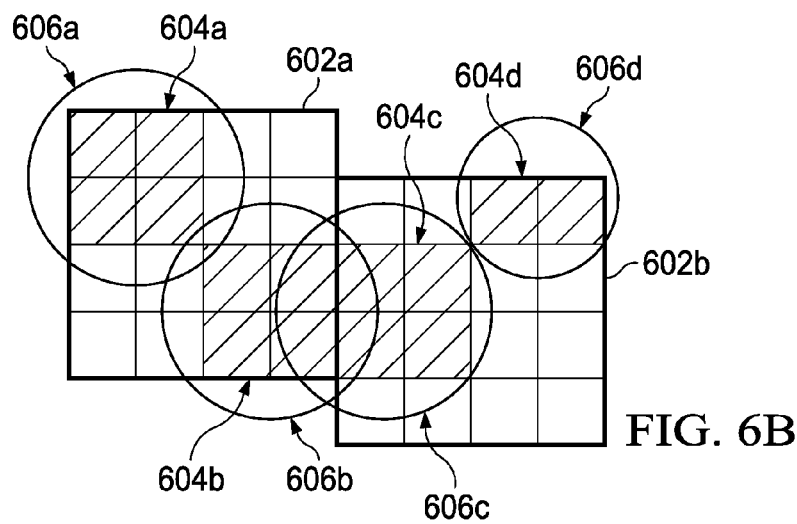
Figure 6C:
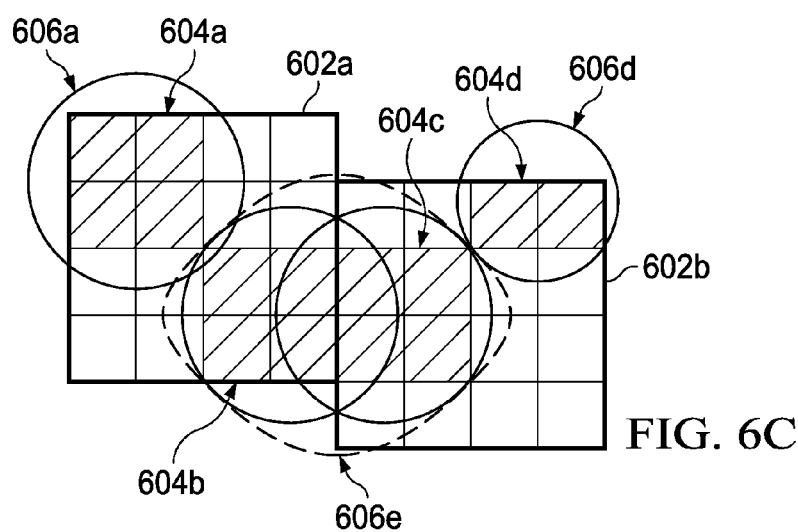

FIGS. 6A-6C illustrate exemplary fetching reference pixel blocks adjacent to one another within a reference frame associated with multimedia data in system 100 of FIG. 1 according to an embodiment. FIG. 6A depicts two adjacent block partitions 602a and 602b associated with the reference frame. Each of the two adjacent block partitions 602a and 602b include 16 reference pixel blocks as illustrated in FIG. 6A. On performing a search for reference data for processing one or more pixel blocks corresponding to the block partitions 602a and 602b, it is determined that the shaded group of reference pixel blocks 604a, 604b, 604c and 604d are the reference pixel blocks unavailable in a cache unit 106 and are to be fetched from a memory 104 of FIG. 1.

Each of the shaded group of reference pixel blocks 604a, 604b, and 604c include four reference pixel blocks and the shaded group of reference pixel block 604d includes a pair of reference pixel blocks as illustrated in FIG. 6A. Instead of generating a reference pixel block fetch command for each reference pixel block in each shaded group of reference pixel blocks 604a, 604b, 604c and 604d (resulting in generating four reference pixel block fetch commands each for processing shaded group of reference pixel blocks 604a, 604b and 604c, and two reference pixel block fetch commands for processing shaded group of reference pixel blocks 604d), the reference pixel block fetch commands may be combined As explained herein with reference to FIGS. 6B and 6C.

In FIG. 6B, reference pixel block fetches for adjacent pixel blocks in a block partition are combined, thereby optimizing the system capacity and improving performance. For example, one reference pixel block fetch command may be generated for each of the shaded group of reference pixel blocks 604a, 604b, 604c and 604d. The reference pixel block fetch commands are generated by combining reference pixel block fetch commands for individual reference pixel blocks in shaded groups of reference pixel blocks 604a, 604b, 604c and 604d as depicted in FIG. 6B. For example, a reference pixel block fetch command 606a may be utilized for fetching the shaded group of reference pixel blocks 604a. Similarly, reference pixel block fetch commands 606b, 606c and 606d may be utilized for fetching the shaded group of reference pixel blocks 604b, 604c and 604d. A number of reference pixel blocks fetches are thereby reduced from 14 to 4, thereby increasing caching performance.

In FIG. 6C, reference pixel block fetches for adjacent pixel blocks in adjacent block partition (such as block partitions 602a and 602b) are combined. In addition to generating the reference pixel block fetch commands 606a and 606d, the reference data fetch for adjacent shaded group of reference pixel blocks 604b and 604c (in adjacent block partitions 602a and 602b) are combined into single reference pixel block fetch command 606e for fetching the shaded group of reference pixel blocks 604b and 604c. A number of reference pixel blocks fetches are thereby reduced from 14 to 3, thereby further increasing caching performance.

Figure 7:
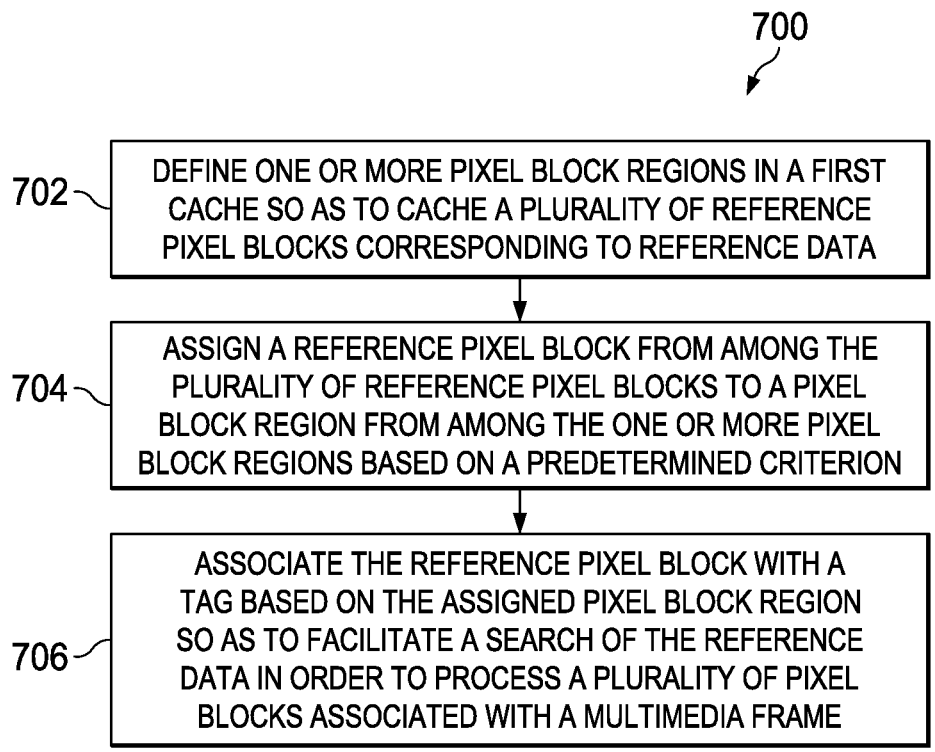
FIG. 7 is a flow chart illustrating an exemplary method of multimedia data processing according to an embodiment.

FIG. 7 is a flow chart illustrating an exemplary method 700 for multimedia data processing, according to an embodiment. In an embodiment, the method 700 may be implemented by a system, such as the system 100 of FIG. 1. Operations of the flowchart, and combinations of operation in the flowchart, may be implemented by various means, such as hardware, firmware, processor, circuitry and/or other device associated with execution of software including one or more computer program instructions. The operations of the method 700 are described with help of the system 100. However, the operations of the method can be described and/or practiced by using any other system. The method 700 starts at operation 702. At operation 702, one or more pixel block regions, such as the pixel blocks regions explained herein with reference to FIG. 2, are defined in a first cache (for example, first cache 106a of FIG. 1) in order to cache a plurality of reference pixel blocks corresponding to reference data. In an embodiment, the reference data may be fetched from one of a memory (for example, memory 104 of FIG. 1) and a second cache (for example, second cache 106b of FIG. 1). In an embodiment, the reference data may correspond to a reference frame of the one or more reference frames stored in the memory.

As explained herein with reference to FIG. 1, each pixel block region may be considered as an allotment of storage space within the first cache, which is capable of caching one or more reference pixel blocks. One or more such storage spaces may be defined (for example, by using processing unit such as the processing unit 102 of FIG. 1) within the first cache in order to cache the plurality of reference pixel blocks fetched from the memory. In an embodiment, number of pixel block regions to be defined may be determined based on a video compression paradigm. Examples of the video compression paradigms include, but are not limited to video coding experts group (VCEG), H.120, H.261, moving pictures experts group (MPEG), MPEG-1 Part 2, H.262 or MPEG-2 Part 2, H.263, MPEG-4 Part 2, H.264 or MPEG-4 AVC, VC-2 (Dirac), high efficiency video coding (HEVC) and the like.

In an embodiment, each pixel block region is defined through span information, a base address, a cache bank identification tag, and/or a reference index. The span information is indicative of dimensions along a length direction (e.g., a height) and a width direction (e.g., a width) of each pixel block region. The base address is offset of a top left address of each pixel block region from an origin predetermined within a space defined by the reference frame and is indicative of the locality of the pixel block region within the space defined by the reference frame. The base address of each pixel block region is expressed in terms of x and y coordinates. The cache bank identification tag is indicative of a cache bank each pixel block region is associated with. The reference index is indicative of the reference frame associated with each pixel block region. For example, if the reference data in the memory 104 comprises 32 reference frames and the pixel block region is associated with reference frame #5 of the 32 reference frames, then the reference index of the pixel block region may indicate the reference frame from which the reference pixel blocks included in the pixel block region are fetched.

At operation 704, a reference pixel block from among the plurality of reference pixel blocks is assigned to a pixel block region from among the one or more pixel block regions based on a predetermined criterion. The predetermined criterion includes, but is not limited to a locality of the reference pixel block within the reference frame and a locality of the pixel block region within the space defined by the reference frame. In an embodiment, reference pixel blocks belonging to a single reference frame is assigned to a pixel block region from among the one or more pixel block regions. In an embodiment, a pixel block region is sparsely filled and includes a few reference pixel block entries (also referred to as elements). In an embodiment, a pixel block region from among the one or more pixel block regions includes nine elements. In an embodiment, each element of the one or more elements associated with a pixel block region is assigned a specific location within the pixel block region based on a locality of each element within the space defined by the corresponding reference frame. In an embodiment, a cache bank identification tag (as explained previously) is associated with each pixel block region to indicate the cache bank each of the one or more pixel block regions is defined within. At operation 706, the reference pixel block is associated with a tag based on the pixel block region so as to facilitate a search of the reference data in order to process a plurality of pixel blocks associated with a multimedia frame. The searching of the reference data for processing of the multimedia frame is explained in FIGS. 8A-8B.

Figure 8A:
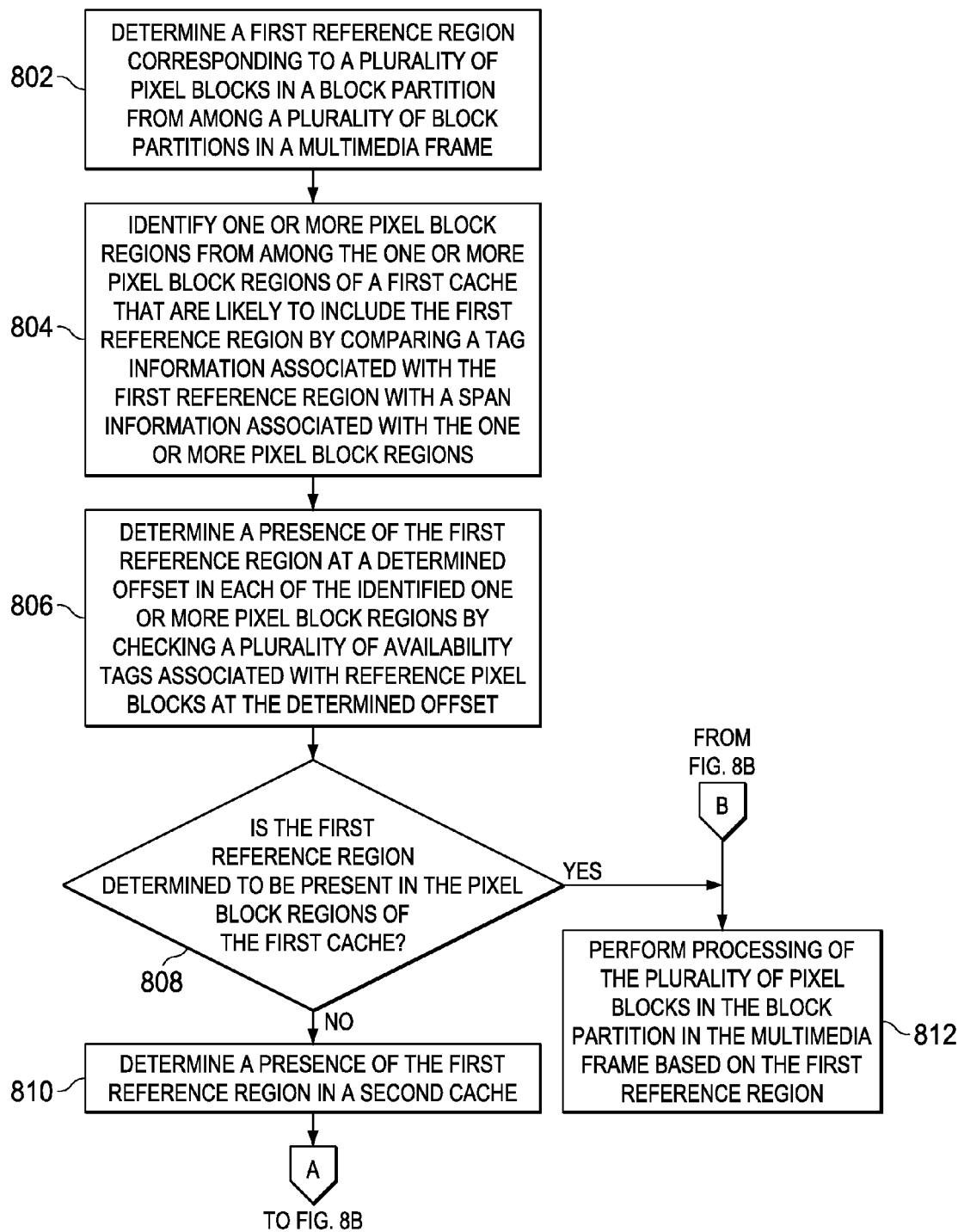
FIGS. 8A-8B collectively show a flow chart illustrating an exemplary method of a reference data search in order to perform a processing of the multimedia frame according to an embodiment.
Figure 8B:
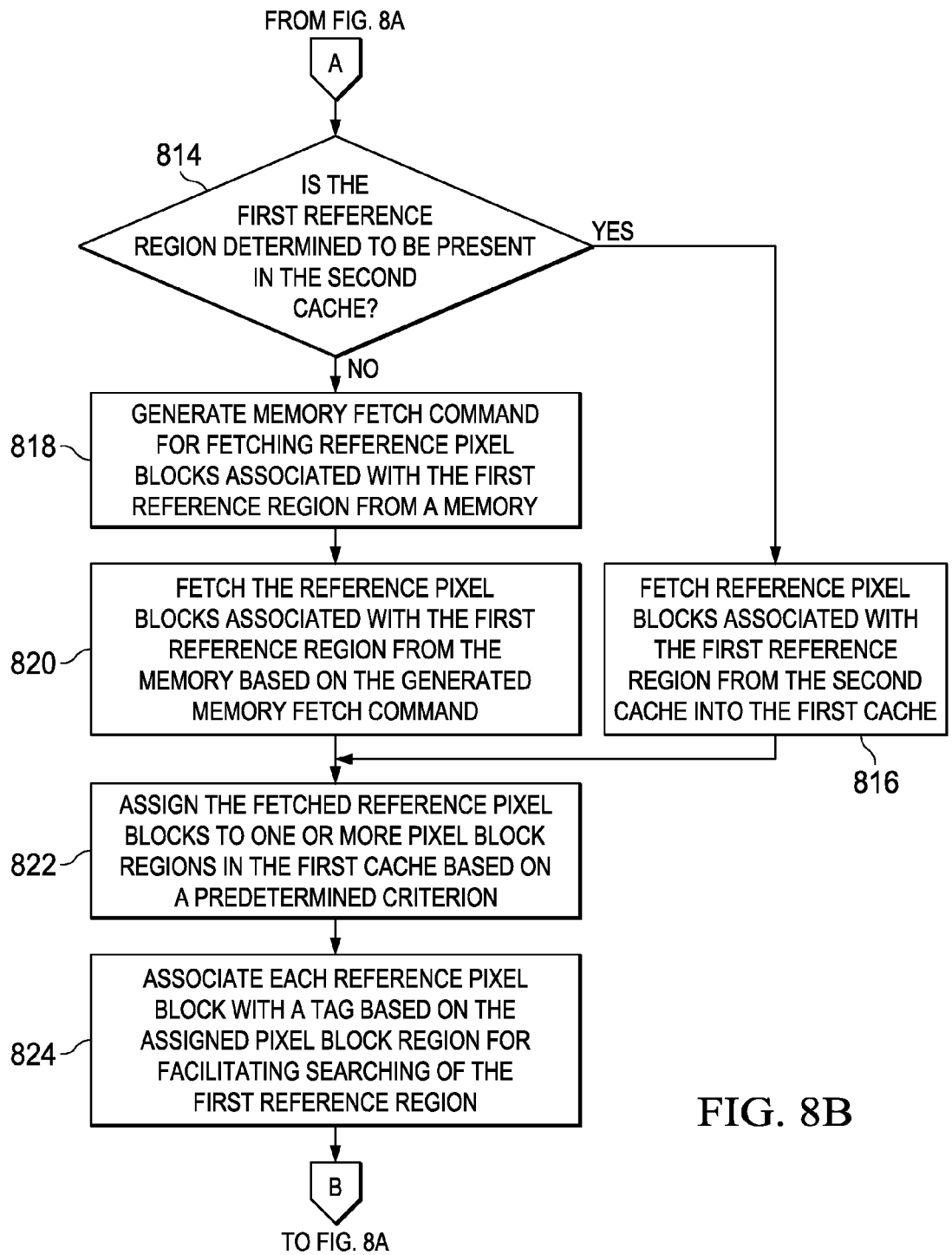

FIGS. 8A-8B collectively show a flow chart illustrating an exemplary method 800 of searching reference data in order to perform processing of the multimedia frame, according to an embodiment. In an embodiment, the system 800 may be implemented by a system, such as the system 100 of FIG. 1. Operations of the flowchart, and combinations of operation in the flowchart, may be implemented by various means, such as hardware, firmware, processor, circuitry and/or other device associated with execution of software including one or more computer program instructions. The operations of the method 800 are described with help of the system 100. However, the operations of the method can be described and/or practiced by using any other system. The method 800 starts at operation 802. At operation 802, a first reference region corresponding to a plurality of pixel blocks in a block partition from among a plurality of block partitions in the multimedia frame is determined for processing the multimedia frame. For example, for a 4×4 pixel block of the multimedia frame, a 9×9 reference region (five additional pixels on each side i.e., three additional pixels on left and two on right) is determined to be fetched from a reference frame for interpolation during motion compensation. Similarly, for an 8×8 pixel block of the frame, a 13×13 reference region block may be determined to be fetched from the reference frame. As explained herein with reference to FIGS. 3A-3C, the first reference region is determined within the reference frame stored in a memory (for example, memory 104 of FIG. 1) and accordingly, the reference pixel blocks within the first reference region are tagged with a reference number corresponding to the reference frame and location co-ordinates corresponding to the locality with the reference frame. At operation 804, pixel block regions from among the one or more pixel block regions of a first cache (for example, first cache 106a of FIG. 1) likely to include the first reference region are identified by comparing tag information associated with the first reference region with span information associated with each pixel block region. The tag information associated with the first reference region includes a reference number (for example, ref #504 of FIG. 5) and location co-ordinates (for example, (X, Y) 506 of FIG. 5). The span information is indicative of dimensions along a length direction (e.g., a height) and a width direction (e.g., a width) of each pixel block region. During the comparison, it is determined if $X>=BA-X$ and $<BA-(X+\text{width of the pixel block region})$ and $Y>=BA-Y$ and $<BA-(Y+\text{height of the pixel block region})$ wherein, BA is a base address of each of the one or more pixel block regions and (X, Y) is location coordinates associated with the first reference region.

For the identified pixel block regions an offset check is performed to determine the presence of the reference pixel blocks within the identified pixel block regions. During the offset check a possible offset of the first reference region within each of the identified pixel block regions is determined based on the span information associated with each of the identified pixel block regions and a location of the first reference region within the reference frame. A presence of the first reference region at the determined possible offset in each of the identified pixel block regions is determined by checking a plurality of availability tags associated with each reference pixel block at the determined possible offset. At operation 806, a presence of the first reference region at a determined possible offset in each of the identified pixel block regions is determined by checking a plurality of availability tags associated with reference pixel blocks at the determined possible offset. In an embodiment, if the reference pixel block is present, an availability tag associated with the reference pixel block is marked as a HIT and if the reference pixel block is absent the availability tag is marked as a MISS. In an embodiment, the marking of the availability tags may be performed as explained herein with reference to FIG. 3C.

At operation 808, it is verified if the first reference region is determined to be present in the pixel block regions of the first cache. If the first reference region is not present in the pixel block regions of the first cache a presence of the first reference region in a second cache (for example, second cache 106b) is determined at operation 810. On the contrary, on determining the presence of the first reference region in the pixel block regions of the first cache, operation 812 is performed. At operation 812, the plurality of pixel blocks in the block partition in of the multimedia frame is processed based on the first reference region. An example of processing of the multimedia frame may include performing motion compensation for frames of the multimedia data for encoding/decoding purposes. On determining a presence of the first reference region in the second cache at operation 810, operation 814 is subsequently performed. At operation 814, it is verified if the first reference region is determined to be present in the second cache. If the first reference region is determined to be present in the second cache, then operation 816 is performed. At operation 816, the reference pixel blocks associated with the first reference region is fetched from the second cache into the first cache.

Alternatively, if the first reference region is determined to be absent in the second cache, at operation 818, a memory fetch command is generated for fetching reference pixel blocks associated with the first reference region from the memory. In an embodiment, the memory fetch command is generated (e.g., using processing unit 102 of FIG. 1) for a cache bank of a plurality of cache banks associated with the first cache. In an embodiment, one or more additional reference pixel blocks to be fetched along with the first reference region is determined, such that the one or more additional reference pixel blocks and one or more reference pixel blocks associated with the first reference region are adjacent to one another within the reference frame and form a rectangular region (contiguous region) within the reference frame. In an embodiment, a memory fetch command is generated to fetch the first reference region and the one or more additional reference pixel blocks as explained herein with reference to FIGS. 6A-6C. In an embodiment, the one or more additional reference pixel blocks and the first reference region correspond to a block partition from among a plurality of block partitions within the reference frame. In one embodiment, the one or more additional reference pixel blocks and the first reference region correspond to adjacent block partitions within the reference frame. The one or more additional reference pixel blocks and the first reference region may be associated with same or different cache banks.

At operation 820, the reference pixel blocks associated with the first reference region are fetched from the memory, based on the generated memory fetch command. In an embodiment, the first reference region is fetched along with the one or more additional reference pixel blocks from the memory based on the generated memory fetch command. A minimum granularity for fetching each of the first reference region from the memory is matched with the size of the pre-fetch buffer associated with the memory. The reference pixel blocks may be fetched from the memory as explained herein with reference to FIGS. 6A-6C. Once the reference pixel blocks are fetched either from the memory or the second cache, then operation 822 is performed.

At operation 822, the fetched reference pixel blocks are assigned to one or more pixel block regions in the first cache based on a predetermined criterion. The predetermined criterion includes, but is not limited to a locality of the reference pixel block within a space defined by the reference frame. A cache bank associated with the assigned reference pixel blocks is configured to expire upon all the reference pixel blocks associated with the cache bank being read from the cache bank. Upon expiration of the cache bank, the reference pixel blocks associated with the cache bank are deleted from the first cache and are assigned to a cache bank associated with the second cache for processing subsequent pixel blocks associated with the multimedia frame. In an embodiment, an availability of a space within the second cache is determined in order to cache the fetched one or more reference pixel blocks. On determining availability of the space, the fetched reference pixel blocks are cached in the second cache. Alternatively, on determining an unavailability of space, one or more previously cached reference pixel blocks in the second cache are deleted and an origin of the second cache is shifted by a predetermined margin in order to cache the fetched reference pixel blocks. Each reference pixel block assigned to the first cache is subjected to operation 824. At operation 824, each reference pixel block is associated with a tag based on the pixel block region so as to facilitate a search of the first reference region during a processing of the multimedia frame.

Without in any way limiting the scope, interpretation, or application of the claims appearing below, advantages of one or more of the exemplary embodiments disclosed herein include a reduction in a memory bandwidth consumption and consequent reduction in power dissipation by the memory and increase in a playback time (for example, the playback time may be increased by three hours) associated with the multimedia data. Defining pixel block regions in a first cache and tagging reference pixel blocks as offset from the base address of the corresponding pixel block region reduces a size of the tagging reference data, thereby reducing a cost of comparison and leading to a sizable savings in power consumption. Also, by using a second cache, a total number of processing cycles is reduced as the number of processing cycles (e.g., 10 processing cycles) utilized for fetching the reference data from the second cache is lesser than the number of processing cycles (e.g., 100 processing cycles) utilized for fetching the reference data from the memory. Also, by grouping reference pixel blocks associated with adjacent pixel blocks in the frame of multimedia data, a number of data phases per burst is increased to about 8 as opposed to 1 in an alternative caching paradigm. The increased data phases per burst leads to a reduction in interconnect and memory interface power.

Additionally, since a size of reference data fetch is matched with a maximum size of a pre-fetch buffer of the memory, power is used efficiently in the system as an equal amount of power is dissipated for fetching one pixel block or one or more pixel blocks of size equivalent to the pre-fetch buffer. The system disclosed herein is configured to operate in a pipeline manner to enable efficient memory fetch operations (e.g., DMA). The pipeline operation of three cache banks described in the detailed description of FIG. 4B eliminates complex logic to maintain coherency and allows parallel and efficient operation of various stages. Furthermore, in the present technology, a memory specification is lowered owing to higher associativity. Moreover, the method and system disclosed herein enables achieving a frame rate close to 120 frames per second.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 100, the processing unit 102, the memory 104 and the cache unit 106 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the exemplary embodiments disclosed herein, may be made without departing from the spirit and scope of the present technology. Additionally, for purposes of illustration, the detailed description refers to pixel blocks associated with a frame; however the scope of the method and system disclosed herein is not limited to the pixel blocks but may be extended to include coding units as per the HEVC paradigm.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology. Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A process of scheduling read and write operations of a cache memory comprising:
   (A) dividing the cache memory into plural banks;
   (B) scheduling data read and write operations in pipeline slots;
   (C) performing a first slot operation in a first sequence of the banks starting with a first bank, a second slot operation in the first sequence of the banks starting with the first bank and offset from the first sequence, and a third slot operation in the first sequence of the banks starting with the first bank and offset from the first and second sequences.

2. The process of claim 1 including dividing the cache memory into a first cache memory of three cache banks and a second cache memory of three cache banks.

3. The process of claim 1 in which the scheduling includes scheduling a front slot, a DMA slot, and a back slot.

4. The process of claim 1 in which the scheduling includes scheduling a front slot operation, a DMA slot operation, and a back slot operation:
   the front slot operation processing the data including determining reference data to be fetched from a main memory and generating main memory fetch commands for fetching the reference data;
   the DMA slot operation processing the data including fetching the reference data from the main memory and assigning the fetched reference data to pixel block regions in a bank; and
   the back slot operation processing the data including reading the reference data for configuring a prediction frame for processing a frame of the data associated with multimedia data.

5. The process of claim 4 in which the performing includes:
   performing a front slot operation on the first bank;
   then performing a front slot operation on a second bank while performing a DMA slot operation on the first bank;
   then performing a front slot operation on a third bank while performing a DMA slot operation on the second bank, while performing a back slot operation on the first bank;
   then performing a first DMA slot operation on the third bank, while performing a first back slot operation on the second bank; and
   then performing a first back slot operation on the third bank.

6. The process of claim 4 in which the performing includes:
   performing a front slot operation on the first bank;
   then performing a front slot operation on a second bank while performing a DMA slot operation on the first bank;
   then performing a front slot operation on a third bank while performing a DMA slot operation on the second bank, while performing a back slot operation on the first bank;
   then performing a DMA slot operation on the third bank, while performing a back slot operation on the second bank;
   then performing a back slot operation on the third bank; and
   before performing a second DMA slot operation on the second bank, deleting all data from the first bank.

7. A process of scheduling read and write operations of a cache memory comprising:
   (a) dividing the cache memory into plural banks;
   (b) scheduling data read and write operations in pipeline slots; and (c) performing data read and write operations of each pipeline slot sequentially and through a plurality of passes, on the cache banks, the performing including:
  (i) performing a first front slot operation on a first bank;
  (ii) then performing a first front slot operation on a second bank while performing a first DMA slot operation on the first bank;
  (iii) then performing a front slot operation on a third bank while performing a first DMA slot operation on the second bank, while performing a first back slot operation on the first bank;
  (iv) then performing a first DMA slot operation on the third bank, while performing a first back slot operation on the second bank;
  (v) then performing a first back slot operation on the third bank; and
  (vi) before performing a second DMA slot operation on the second bank, deleting all data from the first bank.

* * * * *